US012587487B2

(12) United States Patent
Suehiro et al.

(10) Patent No.: US 12,587,487 B2
(45) Date of Patent: Mar. 24, 2026

(54) COMMUNICATION CONTROL METHOD, COMMUNICATION SYSTEM, AND TRANSMISSION-SIDE DEVICE

(71) Applicant: TOYOTA JIDOSHA KABUSHIKI KAISHA, Toyota (JP)

(72) Inventors: Yuki Suehiro, Susono (JP); Takahiro Ito, Tama (JP); Hajime Katsuda, Nagareyama (JP); Naoya Kaneko, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 305 days.

(21) Appl. No.: 18/361,047

(22) Filed: Jul. 28, 2023

(65) Prior Publication Data

US 2024/0039865 A1     Feb. 1, 2024

(30) Foreign Application Priority Data

Aug. 1, 2022     (JP) ................................. 2022-122634

(51) Int. Cl.
*H04L 47/80* (2022.01)
(52) U.S. Cl.
CPC .................................. *H04L 47/805* (2013.01)
(58) Field of Classification Search
CPC ........................................... H04L 47/805
USPC ......................................................... 370/329
See application file for complete search history.

(56) References Cited

U.S. PATENT DOCUMENTS

| | | | |
|---|---|---|---|
| 2003/0072269 | A1 | 4/2003 | Teruhi et al. |
| 2008/0049778 | A1 | 2/2008 | Yano et al. |
| 2008/0320156 | A1 | 12/2008 | Chen et al. |
| 2019/0394626 | A1 | 12/2019 | Hitotsumatsu et al. |
| 2020/0057628 | A1 | 2/2020 | Sano |
| 2020/0201315 | A1 | 6/2020 | Gogna et al. |
| 2021/0065474 | A1 | 3/2021 | Liu et al. |
| 2022/0321497 | A1* | 10/2022 | Watanabe ............... H04L 47/12 |

(Continued)

FOREIGN PATENT DOCUMENTS

| | | | |
|---|---|---|---|
| JP | 2004-007361 | A | 1/2004 |
| JP | 2008-54089 | A | 3/2008 |
| JP | 2009-060587 | A | 3/2009 |

(Continued)

*Primary Examiner* — Robert J Lopata
(74) *Attorney, Agent, or Firm* — Sughrue Mion, PLLC

(57) ABSTRACT

A communication control method for controlling a communication between a transmission-side device and a reception-side device is provided. The communication control method includes data transmission processing that transmits multiple types of transmission target data in parallel from the transmission-side device to the reception-side device by using multiple communication lines. The data transmission processing includes: acquiring an available communication speed of each of the multiple communication lines; acquiring data priority of the multiple types of transmission target data; selecting the multiple communication lines one by one in sequence; and allocating the multiple types of transmission target data to the selected communication line in an order of the data priority such that the selected communication line is used up to a specified speed equal to or lower than the available communication speed of the selected communication line.

9 Claims, 11 Drawing Sheets

1: COMMUNICATION SYSTEM

(56)                    References Cited

U.S. PATENT DOCUMENTS

| | | |
|---|---|---|
| 2022/0332333 A1 | 10/2022 | Kurokawa et al. |
| 2022/0353316 A1 * | 11/2022 | Ito .......................... H04L 65/613 |

FOREIGN PATENT DOCUMENTS

| | | |
|---|---|---|
| JP | 2013-187876 A | 9/2013 |
| JP | 2020-3934 A | 1/2020 |
| JP | 2020-199880 A | 12/2020 |
| JP | 2020-201792 A | 12/2020 |
| JP | 2022-515154 A | 2/2022 |
| JP | 2022-104107 A | 7/2022 |
| WO | 2004/086697 A1 | 10/2004 |
| WO | 2018/185994 A1 | 10/2018 |

* cited by examiner

1: COMMUNICATION SYSTEM

| | SIGNAL DISCONTINUITY | DELAY OF PREDETERMINED LEVEL | SIGNAL LOSS OF PREDETERMINED LEVEL | DATA PRIORITY |
|---|---|---|---|---|
| STEERING ANGLE | × | × | × | ① |
| ACCELERATION AMOUNT | × | × | × | ① |
| BRAKING AMOUNT | × | × | × | ① |
| HORN | ○ | △ | ○ | ② |
| RIGHT BLINKER | ○ | ○ | ○ | ③ |
| LEFT BLINKER | ○ | ○ | ○ | ③ |

*FIG. 9*

COMMUNICATION CONTROL METHOD, COMMUNICATION SYSTEM, AND TRANSMISSION-SIDE DEVICE

CROSS-REFERENCE TO RELATED APPLICATION

The present disclosure claims priority to Japanese Patent Application No. 2022-122634, filed on Aug. 1, 2022, the contents of which application are incorporated herein by reference in their entirety.

TECHNICAL FIELD

The present disclosure relates to a technique for transmitting data from a transmission-side device to a reception-side device by using multiple communication lines.

BACKGROUND ART

Patent Literature 1 discloses a data transmission control method for transmitting data from a transmission source node to a transmission destination node via multiple communication paths. The transmission source node distributes transmission data to the multiple communication paths to transmit them. More specifically, the transmission source node adaptively determines a distribution ratio of the transmission data to the multiple communication paths based on quality information of the multiple communication paths. Then, the transmission source node transmits packets with a series of sequence numbers to the multiple communication paths at the determined distribution ratio. The transmission destination node rearranges packets received from the multiple communication paths in an order of the sequence number. The transmission destination node measures communication qualities of the multiple communication paths and feeds back the measurement result as the quality information to the transmission source node.

LIST OF RELATED ART

Patent Literature 1: Japanese Laid-Open Patent Application No. JP-2004-007361

SUMMARY

Transmitting data from a transmission-side device to a reception-side device by using multiple communication lines is considered. Each communication line has an available communication speed (i.e., a maximum amount of data that can be communicated per unit time). When transmission target data exceeding the available communication speed is allocated to a certain communication line, a part of the transmission target data is retained in a buffer, and thus a communication delay (particularly queuing delay) in the communication line increases.

An object of the present disclosure is to provide a technique capable of suppressing a communication delay when data is transmitted from a transmission-side device to a reception-side device by using multiple communication lines.

A first aspect is directed to a communication control method for controlling a communication between a transmission-side device and a reception-side device.

The communication control method includes data transmission processing that transmits multiple types of transmission target data in parallel from the transmission-side device to the reception-side device by using multiple communication lines.

The data transmission processing includes:

acquiring an available communication speed of each of the multiple communication lines;

acquiring data priority of the multiple types of transmission target data;

selecting the multiple communication lines one by one in sequence; and allocating the multiple types of transmission target data to the selected communication line in an order of the data priority such that the selected communication line is used up to a specified speed equal to or lower than the available communication speed of the selected communication line.

A second aspect is directed to a communication system.

The communication system includes a transmission-side device and a reception-side device.

The transmission-side device is configured to execute data transmission processing that transmits multiple types of transmission target data in parallel to the reception-side device by using multiple communication lines.

The data transmission processing includes:

acquiring an available communication speed of each of the multiple communication lines;

acquiring data priority of the multiple types of transmission target data;

selecting the multiple communication lines one by one in sequence; and allocating the multiple types of transmission target data to the selected communication line in an order of the data priority such that the selected communication line is used up to a specified speed equal to or lower than the available communication speed of the selected communication line.

A third aspect is directed to a transmission-side that transmits data to a reception-side device.

The transmission-side device includes a control device configured to execute data transmission processing that transmits multiple types of transmission target data in parallel to the reception-side device by using multiple communication lines.

The data transmission processing includes:

acquiring an available communication speed of each of the multiple communication lines;

acquiring data priority of the multiple types of transmission target data;

selecting the multiple communication lines one by one in sequence; and allocating the multiple types of transmission target data to the selected communication line in an order of the data priority such that the selected communication line is used up to a specified speed equal to or lower than the available communication speed of the selected communication line.

According to the present disclosure, the multiple communication lines are selected one by one in sequence. Then, the transmission target data is allocated to the selected communication line such that the selected communication line is used up to the specified speed equal to or lower than the available communication speed of the selected communication line. In other words, the transmission target data is allocated to the selected communication line so as not to exceed the available communication speed of the selected communication line. Therefore, the communication delay is suppressed.

BRIEF DESCRIPTION OF DRAWINGS

FIG. 9 is a conceptual diagram for explaining a second example of data priority of transmission target data according to an embodiment of the present disclosure;

DETAILED DESCRIPTION

Embodiments of the present disclosure will be described with reference to the accompanying drawings.

1. Communication System

Figure 1:
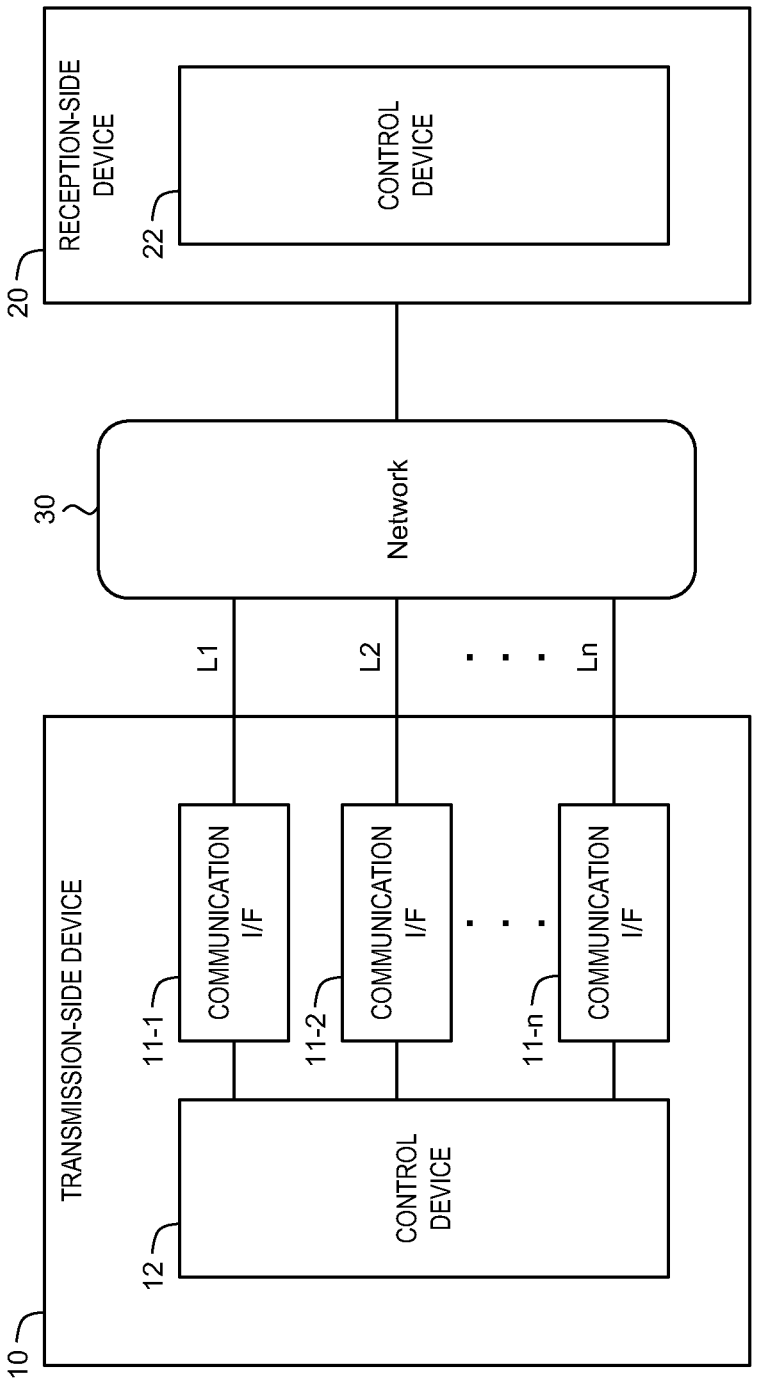
FIG. 1 is a block diagram for explaining an overview of a communication system according to an embodiment of the present disclosure.

FIG. 1 is a block diagram for explaining an overview of a communication system 1 according to the present embodiment. The communication system 1 includes a transmission-side device 10, a reception-side device 20, and a communication network 30. The transmission-side device 10 and the reception-side device 20 are connected to each other via the communication network 30. The transmission-side device 10 transmits data to the reception-side device 20 via the communication network 30. The reception-side device 20 receives data from the transmission-side device 10 via the communication network 30.

The transmission-side device 10 is configured to be able to use multiple communication lines L1 to Ln. Here, n is an integer equal to or more than 2. The multiple communication lines L1 to Ln can also be referred to as multiple communication methods or multiple communication carriers. Examples of the communication method include a common cellular method provided by MNO (Mobile Network Operator), an inexpensive cellular method provided by MVNO (Mobile Virtual Network Operator), a wireless LAN (Local Area Network) method, and the like. A communication cost differs among the multiple types of communication methods. In the example above, the wireless LAN method is the lowest and the common cellular method is the highest.

As shown in FIG. 1, the transmission-side device 10 includes multiple communication interfaces 11-1 to 11-$n$ and a control device 12.

The multiple communication interfaces 11-1 to 11-$n$ are associated with the multiple communication lines L1 to Ln (multiple communication methods, multiple communication carriers), respectively. It should be noted that the multiple communication interfaces 11-1 to 11-$n$ may be realized by different physical interfaces, or may be realized by a combination of a common physical interface and different logical interfaces.

The control device 12 controls the transmission-side device 10. For example, the control device 12 executes "data transmission processing" that transmits transmission target data from the transmission-side device 10 to the reception-side device 20. The control device 12 is realized by, for example, a cooperation of a processor and a control program. The control program is stored in a memory device. Functions of the control device 12 are realized by the processor executing the control program. The control program may be recorded on a non-transitory computer-readable recording medium.

The reception-side device 20 includes a control device 22. The control device 22 controls the reception-side device 20. For example, the control device 22 receives data transmitted from the transmission-side device 10. The control device 22 is realized by, for example, a cooperation of a processor and a control program. The control program is stored in a memory device. Functions of the control device 22 are realized by the processor executing the control program. The control program may be recorded on a non-transitory computer-readable recording medium.

2. Data Transmission Processing Using Multiple Communication Lines

Hereinafter, the data transmission processing using the multiple communication lines L1 to Ln will be considered. The transmission-side device 10 (the control device 12) is able to transmit multiple types of transmission target data D1 to Dm in parallel by using the multiple communication lines L1 to Ln (the multiple communication interfaces 11-1 to 11-$n$). Here, m is an integer equal to or more than 2.

The transmission-side device 10 may divide a certain transmission target data Dj and transmit multiple divided data in parallel via different communication lines. Identification information including a sequence number is given to a data unit (e.g., packet, frame) of the transmission target data Dj. The reception-side device 20 receives the multiple divided data transmitted via the different communication lines. Based on the sequence numbers given to the received divided data, the reception-side device 20 can appropriately combine the multiple divided data to restore the original data Dj.

In the present embodiment, attention is paid particularly to an available communication speed Ri [bps] of the communication line Li ($i$=1 to n). The available communication speed Ri of the communication line Li is a maximum amount of data that can be transmitted per unit time by the communication line Li. The available communication speed Ri can be rephrased as a bandwidth.

When transmission target data exceeding the available communication speed Ri is allocated to the communication line Li, a part of the transmission target data is retained in a buffer, and thus a communication delay (particularly, queuing delay) in the communication line Li increases. The present embodiment proposes a technique capable of suppressing such the communication delay.

2-1. First Example

Figure 2:
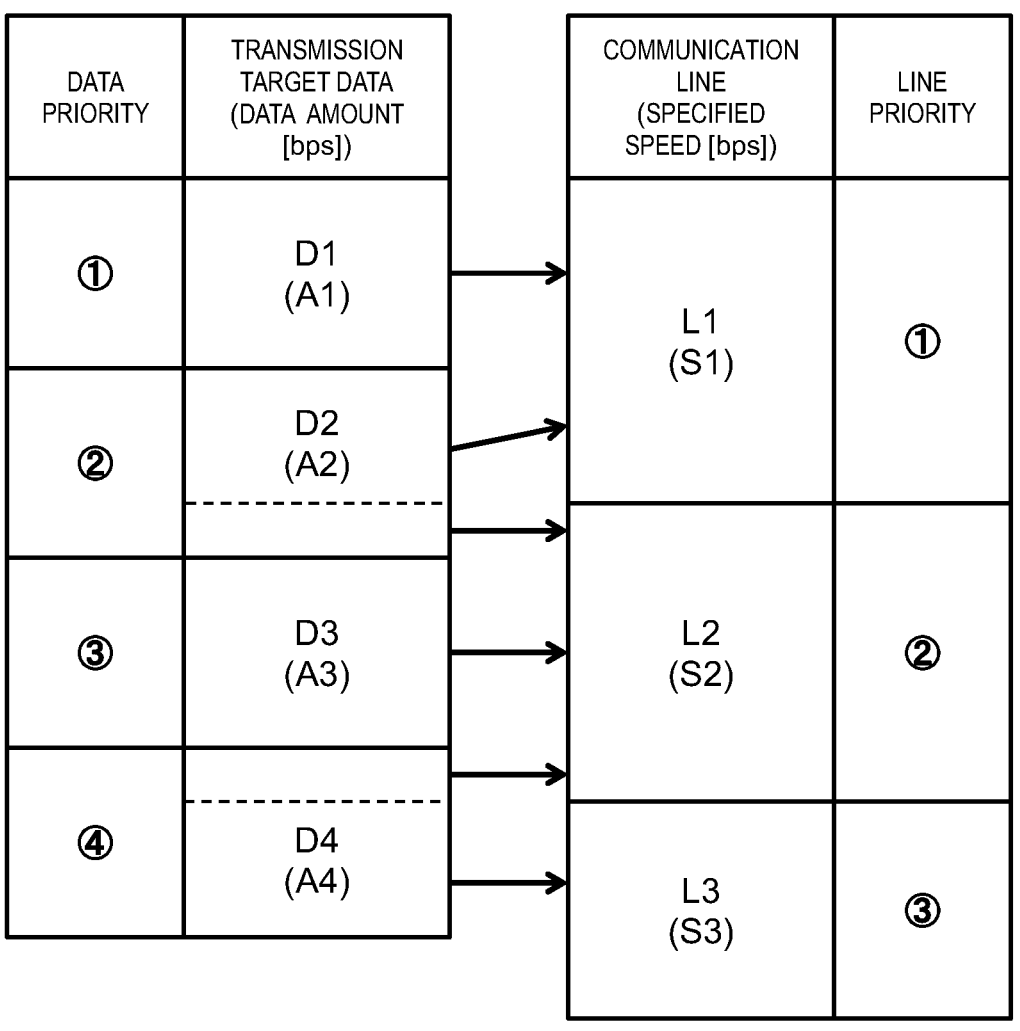
FIG. 2 is a conceptual diagram for explaining a first example of data transmission processing performed by a transmission-side device according to an embodiment of the present disclosure.

FIG. 2 is a conceptual diagram for explaining a first example of the data transmission processing performed by the transmission-side device 10. In this example, it is assumed that there are four types of transmission target data D1 to D4 and three communication lines L1 to L3. A data amount per unit time of the transmission target data Dj (j=1 to 4) is represented by Aj [bps].

The transmission-side device 10 acquires the available communication speed Ri of each communication line Li (i=1 to 3). The available communication speed Ri of the communication line Li may be an actual measured value or may be an estimated value. For example, the available communication speed Ri (throughput) can be measured based on the amount of data transmitted from the transmission-side device 10 to the reception-side device 20 via the communication line Li and feedback from the reception-side device 20. As another example, a communication record database in which the actual measured values of the available communication speed Ri of the communication line Li are accumulated for each position may be prepared. Referring to the communication record database makes it possible to estimate (predict) the available communication speed Ri of the communication line Li in the vicinity of a position of the transmission-side device 10. It should be note that various methods have been proposed for measuring or estimating the available communication speed Ri, and the method is not particularly limited in the present embodiment.

Moreover, the transmission-side device 10 acquires data priority of the transmission target data D1 to D4. The data priority is set in accordance with a predetermined policy. Examples of the setting of the data priority will be described later. In the example shown in FIG. 2, the transmission target data D1 has the highest data priority, the transmission target data D2 has the next highest data priority, the transmission target data D3 has the next highest data priority, and the transmission target data D4 has the lowest data priority.

Further, the transmission-side device 10 selects the multiple communication lines L1 to L3 one by one in sequence. Here, the transmission-side device 10 may acquire line priority of the multiple communication lines L1 to L3 and select the multiple communication lines L1 to L3 one by one in an order of the line priority. For example, the line priority of the communication line Li is set to be higher as the available communication speed Ri is higher. As another example, the line priority of the communication line Li may be set to be higher as a communication cost is lower. In the example shown in FIG. 2, the communication line L1 has the highest line priority, and the communication line L3 has the lowest line priority.

The communication line Li selected is hereinafter referred to as a "selected communication line Ls." The transmission-side device 10 performs "data allocation processing" that allocates the transmission target data to the selected communication line Ls such that the selected communication line Ls is used up to a specified speed Ss equal to or lower than the available communication speed Rs of the selected communication line Ls. For example, the specified speed Ss is set to be equal to the available communication speed Rs. As another example, the specified speed Ss may be set to "Rs−αs" in consideration of a slight margin as.

More specifically, in the data allocation processing, the transmission-side device 10 allocates the multiple types of transmission target data D1 to D4 to the selected communication line Ls in an order of the above-described data priority such that the selected communication line Ls is used up to the specified speed Ss. When the transmission target data is allocated up to the specified speed Ss of the selected communication line Ls, the next one of the multiple communication lines L1 to L3 is selected and the data allocation processing is performed in the same manner. It should be noted that there is not necessarily a one-to-one allocation relationship between the multiple types of transmission target data D1 to D4 and the multiple communication lines.

In the example shown in FIG. 2, the communication line L1 is first selected. The transmission target data D1 and a part of the transmission target data D2 are allocated to the communication line L1 such that up to the specified speed S1 of the selected communication line L1 is used. Next, the communication line L2 is selected. The rest of the transmission target data D2, the transmission target data D3, and a part of the transmission target data D4 are allocated to the communication line L2 such that up to the specified speed S2 of the selected communication line L2 is used. Next, the communication line L3 is selected, and the rest of the transmission target data D4 is allocated to the communication line L3.

Then, the transmission-side device 10 transmits the data allocated to the communication lines L1 to L3 to the reception-side device 20 via the communication lines L1 to L3, respectively. As a result, the multiple types of transmission target data D1 to D4 are transmitted in parallel to the reception-side device 20 via the communication lines L1 to L3.

2-2. Second Example

Figure 3:
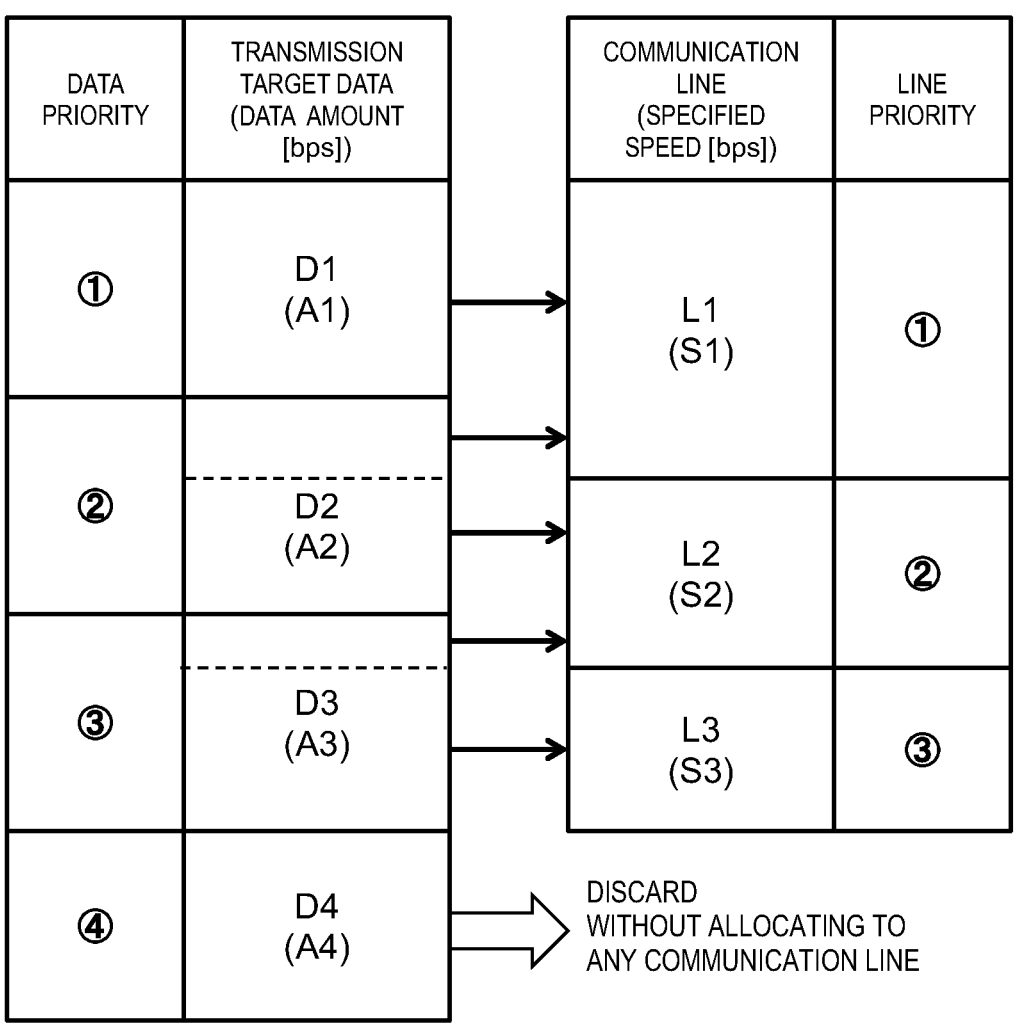
FIG. 3 is a conceptual diagram for explaining a second example of data transmission processing performed by the transmission-side device according to an embodiment of the present disclosure.

FIG. 3 is a conceptual diagram for explaining a second example of the data transmission processing performed by the transmission-side device 10. A description overlapping with the first example described above will be omitted as appropriate.

In the example shown in FIG. 3, a total specified speed (S1+S2+S3) of all the communication lines L1 to L3 is short of a total data amount per unit time (A1+A2+A3+A4) of the transmission target data D1 to D4. Even after all the specified speeds of the communication lines L1 to L3 are used up, some transmission target data not allocated to any of the communication lines remains. Such the transmission target data is hereinafter referred to as "unallocated data."

According to the second example, when the unallocated data is caused, the transmission-side device 10 discards the unallocated data without allocating the unallocated data to any communication line. That is, the transmission-side device 10 excludes the unallocated data from the transmission target and refrains from transmitting the unallocated data to the reception-side device 20.

Since the transmission target data are allocated to the selected communication line Ls in the order of the data priority as described above, the transmission of the transmission target data having the high data priority is guaranteed. What potentially becomes the unallocated data is the transmission target data having a low data priority. Therefore, influence of discarding the unallocated data is minimized.

Figure 4:
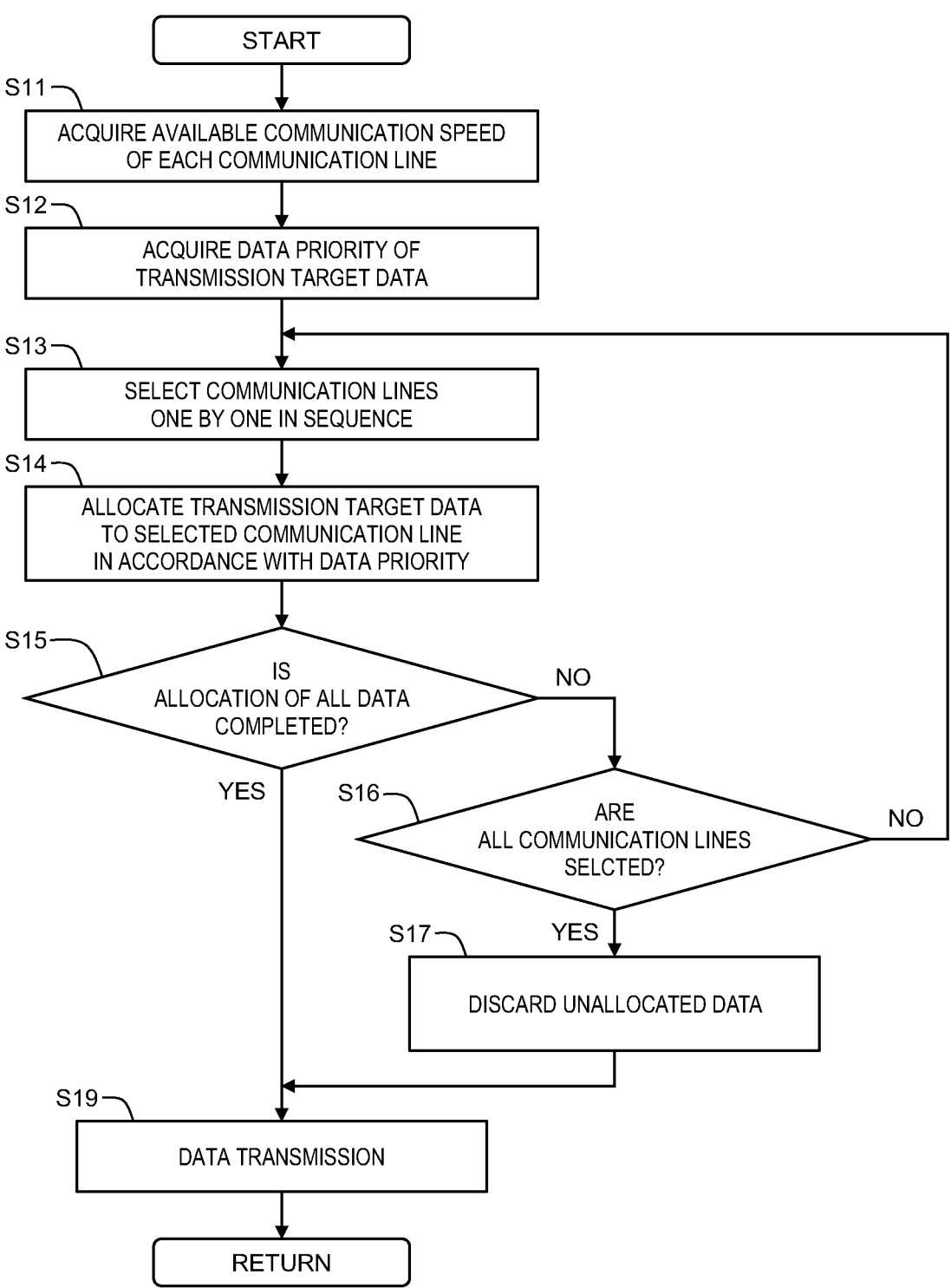
FIG. 4 is a flowchart showing the second example of data transmission processing performed by the transmission-side device according to an embodiment of the present disclosure.

FIG. 4 is a flowchart showing the second example of the data transmission processing. In Step S11, the transmission-side device 10 acquires the available communication speed Ri of each communication line Li. In Step S12, the transmission-side device 10 acquires the data priority of the transmission target data D1 to Dm.

In Step S13, the transmission-side device 10 selects the multiple communication lines L1 to Ln one by one in sequence. The transmission-side device may acquire the line priority of the multiple communication lines L1 to Ln and select the multiple communication lines L1 to Ln one by one in the order of the line priority.

In Step S14, the transmission-side device 10 performs the data allocation process. That is, the transmission-side device 10 allocates the transmission target data D1 to Dm to the selected communication line Ls in the order of the data priority such that the selected communication line Ls is used up to the specified speed Ss equal to or lower than the available communication speed Rs. When the transmission target data are allocated up to the specified speed Ss of the selected communication line Ls, the processing proceeds to Step S15.

In Step S15, the transmission-side device 10 determines whether or not the allocation of all the transmission target data D1 to Dm is completed. When the allocation of all the transmission target data D1 to Dm is completed (Step S15; Yes), the processing proceeds to Step S19. Otherwise (Step S15; No), the processing proceeds to Step S16.

In Step S16, the transmission-side device 10 determines whether or not all the communication lines L1 to Ln have been selected. When there is a communication line that is not yet selected (Step S16; No), the processing returns to Step S13, and the next communication line is selected. On the other hand, when all of the communication lines L1 to Ln have been selected (Step S16; Yes), the processing proceeds to Step S17.

In Step S17, the transmission-side device 10 discards the unallocated data without allocating it to any communication line. That is, the transmission-side device 10 excludes the unallocated data from the transmission target. Thereafter, the processing proceeds to Step S19.

In Step S19, the transmission-side device 10 transmits the data allocated to the communication lines L1 to Ln to the reception-side device 20 via the communication lines L1 to Ln, respectively.

2-3. Third Example

Figure 5:
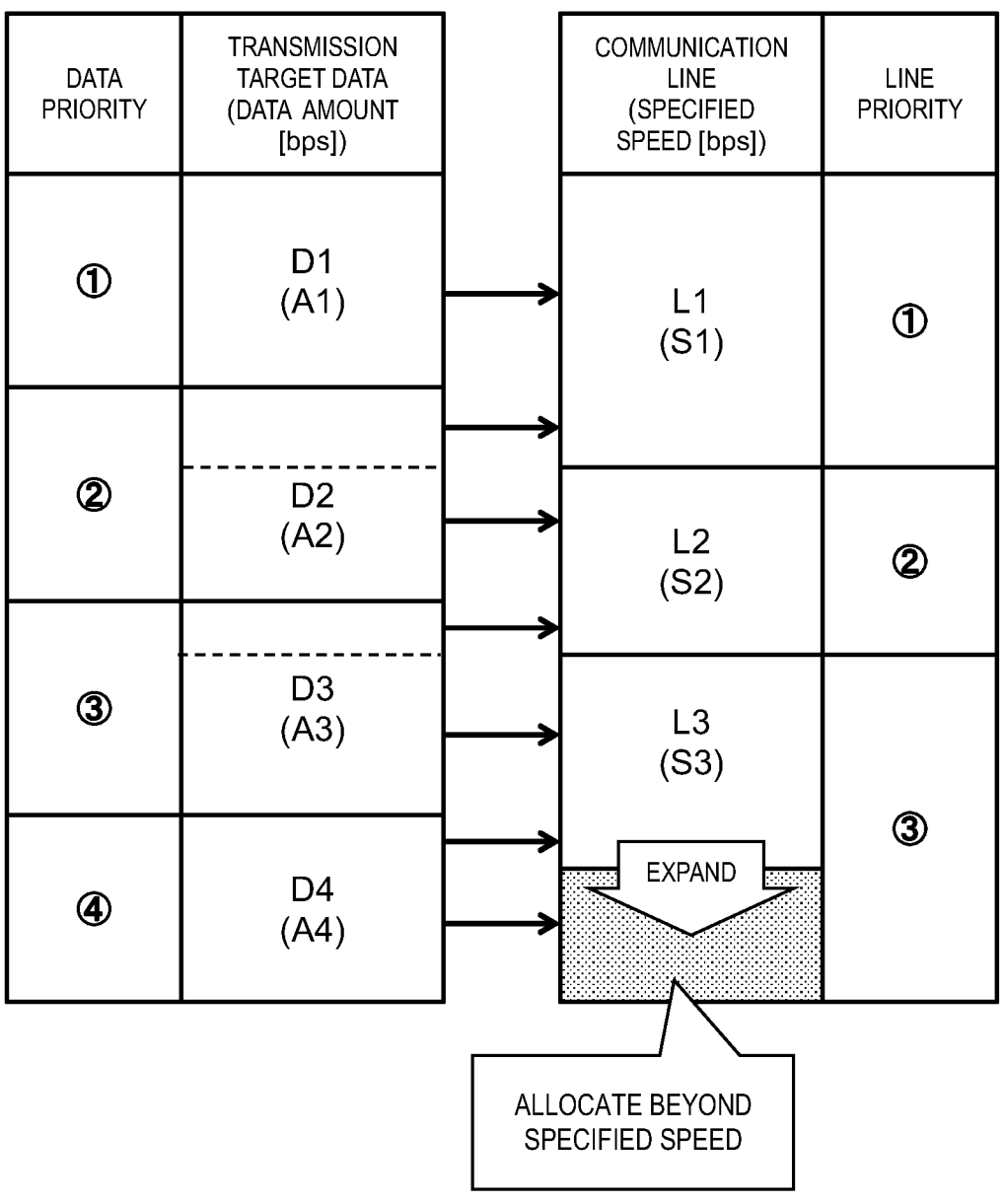
FIG. 5 is a conceptual diagram for explaining a third example of data transmission processing performed by the transmission-side device according to an embodiment of the present disclosure.

FIG. 5 is a conceptual diagram for explaining a third example of the data transmission processing performed by the transmission-side device 10. A description overlapping with the second example described above will be omitted as appropriate.

A communication line having the lowest line priority among the multiple communication lines L1 to Ln is hereinafter referred to as a "lowest priority communication line." In the example shown in FIG. 5, the communication line L3 is the lowest priority communication line. According to the third example, when the unallocated data is caused, the transmission-side device 10 allocates the unallocated data to the lowest priority communication line beyond the specified speed of the lowest priority communication line.

Since the transmission target data is allocated beyond the specified speed of the lowest priority communication line, a communication delay may be caused in the lowest priority communication line. However, what is allocated to the lowest priority communication line is the transmission target data having a relatively low data priority. A communication delay of the transmission target data having a relatively low data priority is allowable. On the other hand, a communication delay of the transmission target data having a high data priority is suppressed.

Figure 6:
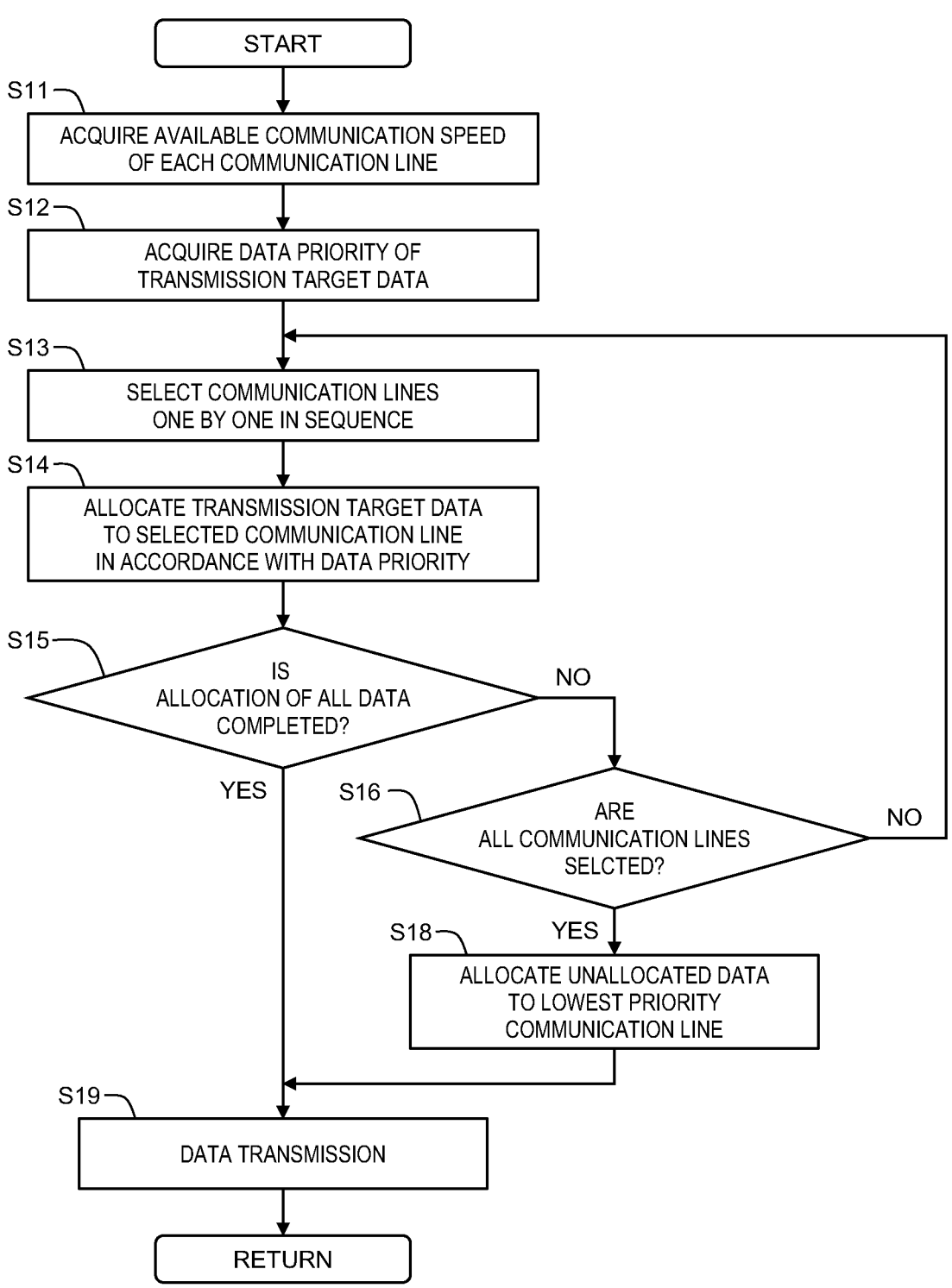
FIG. 6 is a flowchart showing the third example of data transmission processing performed by the transmission-side device according to an embodiment of the present disclosure.

FIG. 6 is a flowchart showing the third example of the data transmission processing. As compared with the case of the second example shown in FIG. 4, Step S17 is replaced with Step S18. In Step S18, the transmission-side device 10 allocates the unallocated data to the lowest priority communication line beyond the specified speed of the lowest priority communication line. The others are the same as in the case of FIG. 4.

2-4. Effects

According to the present embodiment, as described above, the multiple communication lines L1 to Ln are selected one by one in sequence. Then, the transmission target data is allocated to the selected communication line Ls such that the selected communication line Ls is used up to the specified speed Ss equal to or lower than the available communication speed Rs of the selected communication line Ls. In other words, the transmission target data is allocated to the selected communication line Ls so as not to exceed the available communication speed Rs of the selected communication line Ls. Therefore, occurrence of the queuing delay is suppressed. That is, the communication delay when the data transmission is performed using the multiple communication lines L1 to Ln is suppressed.

In addition, according to the present embodiment, the multiple types of transmission target data D1 to Dm are allocated to the selected communication line Ls in the order of the data priority. Therefore, the transmission of the transmission target data having a high data priority is guaranteed. Moreover, the communication delay of the transmission target data having a high data priority is suppressed.

The multiple communication lines L1 to Ln may be selected one by one in the order of the line priority. In this case, the transmission target data having a high data priority is allocated to the communication line having a high line priority, which is appropriate.

The line priority of the communication line Li may be set to be higher as the available communication speed Ri is higher. In this case, the transmission target data are allocated to the communication line Li in the order of the available communication speed Ri. As a result, the number of communication lines to be used may be reduced. This is preferable from a viewpoint of reduction of communication costs.

The specified speed Ss may be equal to the available communication speed Rs. In this case, the available communication speed Rs of the selected communication line Ls can be effectively utilized without waste.

3. Remote Operation System

Hereinafter, as an application example of the communication system 1 according to the present embodiment, a "remote operation system" that performs a remote operation (remote driving) of a moving body will be considered. Examples of the moving body being a target of the remote operation include a vehicle, a robot, a flying object, and the like. The vehicle may be an autonomous driving vehicle or may be a vehicle driven by a driver. Examples of the robot include a logistics robot, a work robot, and the like. Examples of the flying object include an airplane, a drone, and the like.

As an example, in the following description, a case where the moving body being the target of the remote operation is a vehicle will be considered. When generalizing, "vehicle" in the following description shall be deemed to be replaced with "moving body."

Figure 7:
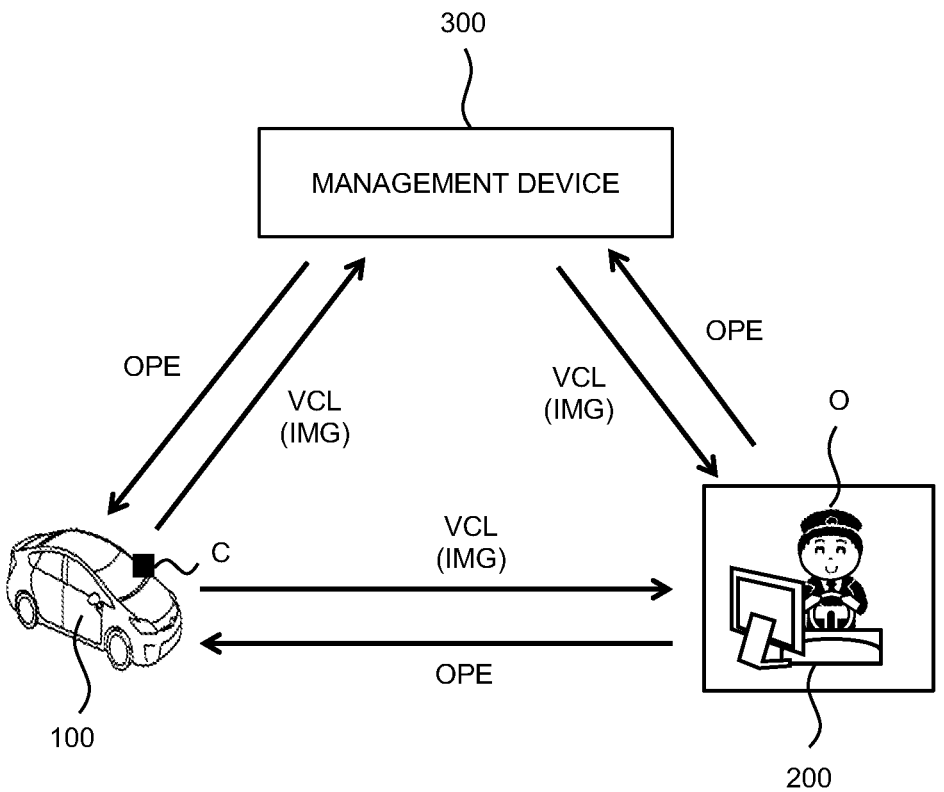
FIG. 7 is a conceptual diagram for explaining an overview of a remote operation system according to an embodiment of the present disclosure.

FIG. 7 is a schematic diagram showing a configuration example of a remote operation system according to the present embodiment. The remote operation system includes a vehicle 100, a remote operator terminal 200, and a management device 300. The vehicle 100 is the target of the remote operation. The remote operator terminal 200 is a terminal device used by a remote operator O when remotely operating the vehicle 100. The remote operator terminal 200 can also be referred to as a remote operation human machine interface (HMI). The management device 300 manages the remote operation system. Typically, the management device 300 is a management server on a cloud. The management server may be configured by a plurality of servers that perform distributed processing.

The vehicle 100, the remote operator terminal 200, and the management device 300 are capable of communicating with each other via a communication network. The vehicle 100 and the remote operator terminal 200 can communicate with each other via the management device 300. The vehicle 100 and the remote operator terminal 200 may directly communicate with each other without through the management device 300.

Various sensors including a camera C are installed on the vehicle 100. The camera C images a situation around the vehicle 100 to acquire an image IMG indicating the situation around the vehicle 100. Vehicle information VCL is information acquired by the various sensors. For example, the vehicle information VCL includes the image IMG captured by the camera C. The vehicle information VCL may include a position and a state (for example, a speed, a steering angle, and the like) of the vehicle 100. The vehicle 100 transmits the vehicle information VCL to the remote operator terminal 200.

The remote operator terminal 200 receives the vehicle information VCL transmitted from the vehicle 100. The remote operator terminal 200 presents the vehicle information VCL to the remote operator O. More specifically, the remote operator terminal 200 includes a display device, and displays the image IMG and the like on the display device. The remote operator O views the displayed information, recognizes the situation around the vehicle 100, and performs the remote operation of the vehicle 100. Remote operation information OPE is information relating to the remote operation performed by the remote operator O. For example, the remote operation information OPE includes an amount of operation performed by the remote operator O. The remote operator terminal 200 transmits the remote operation information OPE to the vehicle 100.

The vehicle 100 receives the remote operation information OPE transmitted from the remote operator terminal 200. The vehicle 100 performs vehicle travel control in accordance with the received remote operation information OPE. In this manner, the remote operation of the vehicle 100 is realized.

The transmission-side device 10 is one of the vehicle 100 and the remote operator terminal 200. The reception-side device 20 is the other of the vehicle 100 and the remote operator terminal 200. The transmission target data is data necessary for the remote operation performed by the remote operator O. For example, when the vehicle 100 is the transmission-side device 10 and the remote operator terminal 200 is the reception-side device 20, the transmission target data is the vehicle information VCL. On the other hand, when the remote operator terminal 200 is the transmission-side device 10 and the vehicle 100 is the reception-side device 20, the transmission target data is the remote operation information OPE.

3-1. First Example of Data Priority

Figure 8:
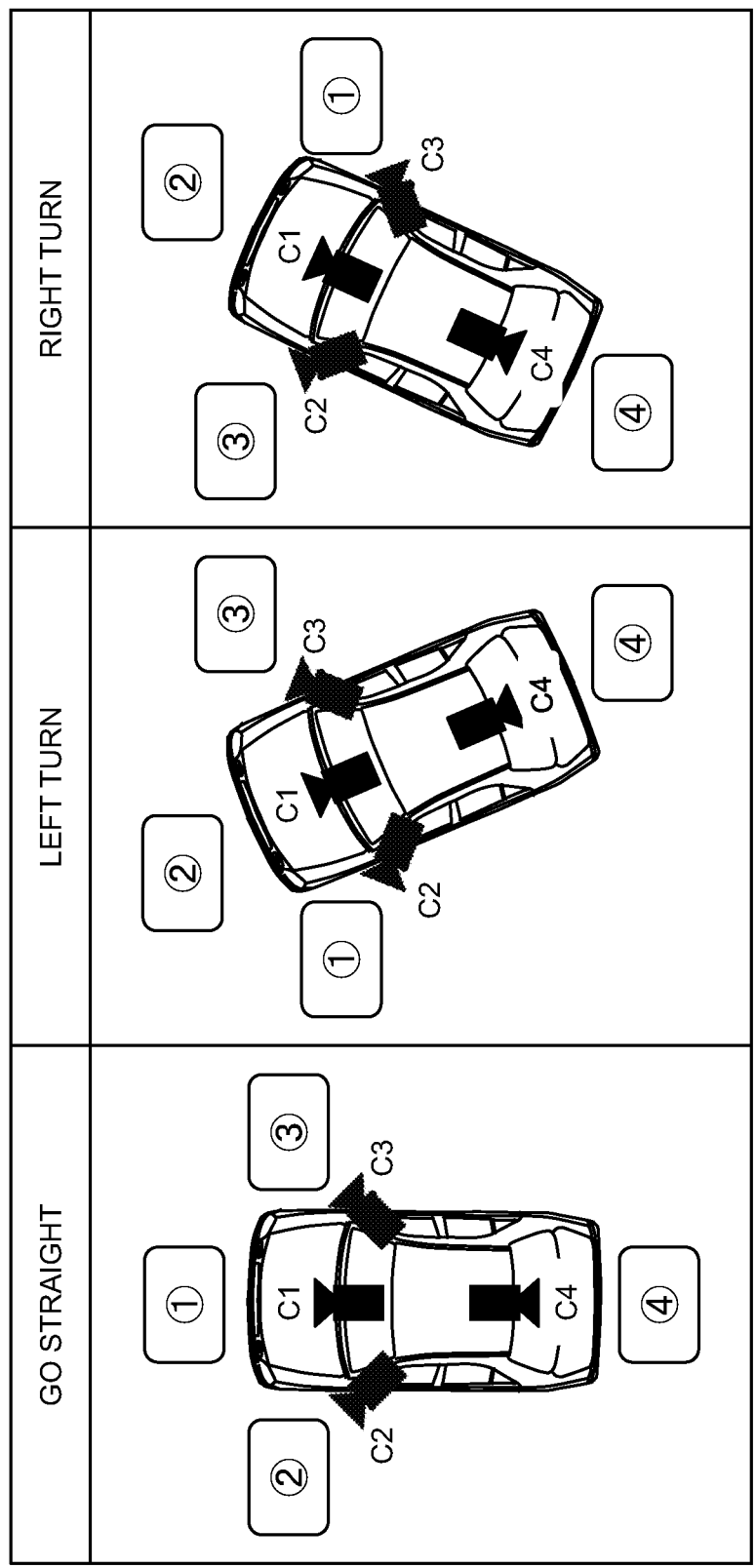
FIG. 8 is a conceptual diagram for explaining a first example of data priority of transmission target data according to an embodiment of the present disclosure.

FIG. 8 is a conceptual diagram for explaining a first example of the data priority of the transmission target data. In the example shown in FIG. 8, the vehicle 100 is the transmission-side device 10, and the remote operator terminal 200 is the reception-side device 20. The transmission target data transmitted from the vehicle 100 to the remote operator terminal 200 includes the image IMG captured by the camera C mounted on the vehicle 100.

In the example shown in FIG. 8, the vehicle 100 includes a front camera C1, a left front camera C2, a right front camera C3, and a rear camera C4. The front camera C1 captures a front image IMG1. The left front camera C2 captures a left front image IMG2. The right front camera C3 captures a right front image IMG3. The rear camera C4 captures a rear image IMG4.

The multiple types of transmission target data D1 to D4 are multiple types of images IMG1 to IMG4 respectively captured by the multiple cameras C1 to C4. The data priority of the transmission target data D1 to D4 corresponds to data priority of the images IMG1 to IMG4. The data priority of the images IMG1 to IMG4 depends on a scheduled moving direction of the vehicle 100. More specifically, the data priority of an image closer to the scheduled moving direction is set to be higher than the data priority of another image farther from the scheduled moving direction. The circled numbers in FIG. 8 represent the data priority.

In a case where the vehicle 100 goes straight, the scheduled moving direction of the vehicle 100 is a forward direction. In this case, the front image IMG1 has the highest priority, and the rear image IMG4 has the lowest data priority. The priority of the left front image IMG2 and the right front image IMG3 each is lower than that of the front image IMG1 and higher than that of the rear image IMG4.

In a case where the vehicle 100 makes a left turn, the scheduled moving direction of the vehicle 100 is a left direction. In this case, the priority of the left front image IMG2 is higher than the priority of the right front image IMG3. The priority of the front image IMG1 is lower than that of the left front image IMG2 and higher than that of the right front image IMG3. The rear image IMG4 has the lowest priority.

In a case where the vehicle 100 makes a right turn, the scheduled moving direction of the vehicle 100 is a right direction. In this case, the priority of the right front image IMG3 is higher than the priority of the left front image IMG2. The priority of the front image IMG1 is lower than that of the right front image IMG3 and higher than that of the left front image IMG2. The rear image IMG4 has the lowest priority.

The scheduled moving direction of the vehicle 100 can be recognized based on, for example, at least one of a steering wheel steering direction, a steering wheel steering angle, blinker information, and a gear position. As another example, the scheduled moving direction of the vehicle 100 may be recognized based on a current position and a target route of the vehicle 100.

3-2. Second Example of Data Priority

FIG. 9 is a conceptual diagram for explaining a second example of the data priority of the transmission target data. In the example shown in FIG. 9, the remote operator terminal 200 is the transmission-side device 10, and the vehicle 100 is the reception-side device 20. The transmission target data transmitted from the remote operator terminal 200 to the vehicle 100 includes the remote operation information OPE.

In the example shown in FIG. 9, the multiple types of transmission target data D1 to D6 are a steering angle, an acceleration amount, a braking amount, horn, right blinker, and left blinker. Each transmission target data is characterized in terms of whether signal discontinuity is permissible, whether delay of a predetermined level is permissible, or whether signal loss of a predetermined level is permissible. In FIG. 9, a circle mark means permissible, and a cross mark means impermissible.

As for the steering angle, the acceleration amount, and the braking amount, the signal discontinuity is impermissible, the delay of predetermined level is impermissible, and the signal loss of predetermined level is impermissible. The data priority of the steering angle, the acceleration amount, and the braking amount each is set to be relatively high.

On the other hand, as for the right blinker and the left blinker, the signal discontinuity is permissible, the delay of predetermined level is permissible, and the signal loss of predetermined level is permissible. The data priority of the right blinker and the left blinker each is set to be relatively low.

It should be noted that when two or more transmission target data have the same data priority, the data priority may be adjusted in an order of earlier input by the remote operator O. Alternatively, it may be designed in advance such that two or more transmission target data do not have the same data priority.

3-3. Effects

As described above, the communication system 1 according to the present embodiment is applicable to the remote operation system. The transmission-side device 10 is one of the vehicle 100 and the remote operator terminal 200. The reception-side device 20 is the other of the vehicle 100 and the remote operator terminal 200. The transmission target data is data necessary for the remote operation performed by the remote operator O. The delay of data communication required for the remote operation is suppressed by the above-described data transmission processing. Therefore, accuracy of the remote control is improved.

4. Example of Vehicle

4-1. Configuration Example

Figure 10:
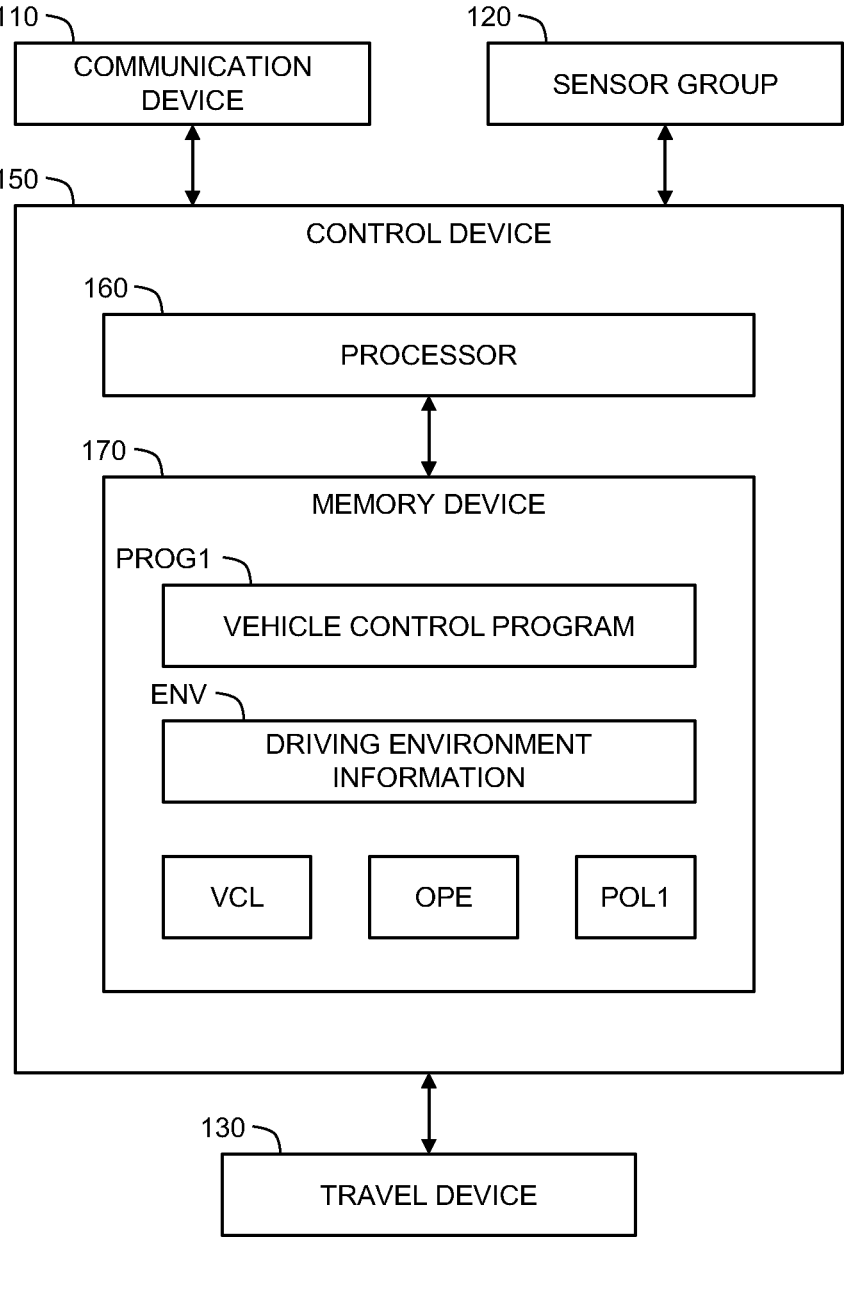
FIG. 10 is a block diagram showing a configuration example of a vehicle according to an embodiment of the present disclosure.

FIG. 10 is a block diagram showing a configuration example of the vehicle 100. The vehicle 100 includes a communication device 110, a sensor group 120, a travel device 130, and a control device (controller) 150.

The communication device 110 communicates with the outside of the vehicle 100. For example, the communication device 110 communicates with the remote operator terminal

200 and the management device 300. The communication device 110 includes the multiple communication interfaces 11-1 to 11-$n$ shown in FIG. 1.

The sensor group 120 includes a recognition sensor, a vehicle state sensor, a position sensor, and the like. The recognition sensor recognizes (detects) a situation around the vehicle 100. Examples of the recognition sensor include the camera C, a laser imaging detection and ranging (LIDAR), a radar, and the like. The vehicle state sensor detects a state of the vehicle 100. Examples of the vehicle state sensor include a speed sensor, an acceleration sensor, a yaw rate sensor, a steering angle sensor, a gear position sensor, and the like. The position sensor detects a position and an orientation of the vehicle 100. For example, the position sensor includes a global navigation satellite system (GNSS).

The travel device 130 includes a steering device, a driving device, and a braking device. The steering device turns wheels. For example, the steering device includes an electric power steering (EPS) device. The driving device is a power source that generates a driving force. Examples of the drive device include an engine, an electric motor, an in-wheel motor, and the like. The braking device generates a braking force.

The control device 150 is a computer that controls the vehicle 100. The control device 150 includes one or more processors 160 (hereinafter simply referred to as a processor 160) and one or more memory devices 170 (hereinafter simply referred to as a memory device 170). The processor 160 executes a variety of processing. For example, the processor 160 includes a central processing unit (CPU). The memory device 170 stores a variety of information necessary for the processing by the processor 160. Examples of the memory device 170 include a volatile memory, a non-volatile memory, a hard disk drive (HDD), a solid state drive (SSD), and the like. The control device 150 may include one or more electronic control units (ECUs).

A vehicle control program PROG1 is a computer program executed by the processor 160. The functions of the control device 150 are implemented by the processor 160 executing the vehicle control program PROG1. The vehicle control program PROG1 is stored in the memory device 170. The vehicle control program PROG1 may be recorded on a non-transitory computer-readable recording medium.

4-2. Driving Environment Information

The control device 150 uses the sensor group 120 to acquire driving environment information ENV indicating a driving environment for the vehicle 100. The driving environment information ENV is stored in the memory device 170.

The driving environment information ENV includes surrounding situation information indicating a result of recognition by the recognition sensor. For example, the surrounding situation information includes the image IMG captured by the camera C. The surrounding situation information further includes object information regarding an object around the vehicle 100. Examples of the object around the vehicle 100 include a pedestrian, another vehicle, a white line, a traffic signal, a sign, a roadside structure, and the like. The object information indicates a relative position and a relative velocity of the object with respect to the vehicle 100.

In addition, the driving environment information ENV includes vehicle state information indicating the vehicle state detected by the vehicle state sensor.

Furthermore, the driving environment information ENV includes vehicle position information indicating the position and the orientation of the vehicle 100. The vehicle position information is acquired by the position sensor. Highly accurate vehicle position information may be acquired by performing a well-known localization using map information and the surrounding situation information (the object information).

4-3. Vehicle Travel Control

The control device 150 executes vehicle travel control that controls travel of the vehicle 100. The vehicle travel control includes steering control, driving control, and braking control. The control device 150 executes the vehicle travel control by controlling the travel device 130 (i.e., the steering device, the driving device, and the braking device).

The control device 150 may execute autonomous driving control based on the driving environment information ENV. More specifically, the control device 150 generates a travel plan of the vehicle 100 based on the driving environment information ENV. Further, the control device 150 generates, based on the driving environment information ENV, a target trajectory required for the vehicle 100 to travel in accordance with the travel plan. The target trajectory includes a target position and a target speed. Then, the control device 150 executes the vehicle travel control such that the vehicle 100 follows the target trajectory.

4-4. Processing Related to Remote Operation

Hereinafter, the case where the remote operation of the vehicle 100 is performed will be described. The control device 150 communicates with the remote operator terminal 200 via the communication device 110.

The control device 150 transmits the vehicle information VCL to the remote operator terminal 200. The vehicle information VCL is information necessary for the remote operation by the remote operator O, and includes at least a part of the driving environment information ENV described above. For example, the vehicle information VCL includes the surrounding situation information (especially, the image IMG). The vehicle information VCL may further include the vehicle state information and the vehicle position information.

In addition, the control device 150 receives the remote operation information OPE from the remote operator terminal 200. The remote operation information OPE is information regarding the remote operation by the remote operator O. For example, the remote operation information OPE includes an amount of operation performed by the remote operator O. The control device 150 performs the vehicle travel control in accordance with the received remote operation information OPE.

The control device 150 may execute the data transmission processing by using the multiple communication lines L1 to Ln (see Section 2 described above).

More specifically, the control device 150 acquires respective available communication speeds R1 to Rn of the multiple communication lines L1 to Ln. The available communication speed Ri of the communication line Li may be an actual measured value or may be an estimated value. For example, the available communication speed Ri (throughput) can be measured based on the amount of data transmitted from the vehicle 100 to the remote operator terminal 200 and feedback from the remote operator terminal 200. As another example, a communication record database in which the actual measured values of the available communication speed Ri of the communication line Li are accumulated for each position may be prepared. Referring to the communication record database makes it possible to estimate (predict) the available communication speed Ri of the communication line Li in the vicinity of the position of the vehicle 100.

In addition, the control device 150 acquires the data priority of the multiple types of transmission target data D1 to Dm. For example, priority policy information POL1 indicating policy of setting of the data priority is stored in advance in the memory device 170. In accordance with the priority policy information POL1, the control device 150 sets the data priority of the multiple types of transmission target data D1 to Dm.

For example, as shown in FIG. 8, the transmission target data D1 to D4 are the images IMG1 to IMG4 captured by the multiple cameras C1 to C4, respectively. The data priority of the transmission target data D1 to D4 corresponds to data priority of the images IMG1 to IMG4. The data priority of the images IMG1 to IMG4 depends on the scheduled moving direction of the vehicle 100. The data priority of an image closer to the scheduled moving direction is set to be higher than the data priority of another image farther from the scheduled moving direction.

The control device 150 acquires reference information that reflects the scheduled moving direction of the vehicle 100. For example, the reference information includes at least one of a steering wheel steering direction, a steering wheel steering angle, blinker information, and a gear position. Such the reference information is obtained from the driving environment information ENV (the vehicle state information). As another example, the reference information may include a current position and a target route of the vehicle 100. The current position of the vehicle 100 is obtained from the driving environment information ENV (the vehicle position information). The target route is determined and known by the control device 150. The control device 150 sets the data priority of the multiple types of images IMG1 to IMG4 based on the scheduled moving direction indicated by the reference information.

The control device 150 selects the multiple communication lines L1 to Ln one by one in sequence. At this time, the control device 150 may acquire the line priority of the multiple communication lines L1 to Ln and select the multiple communication lines L1 to Ln one by one in the order of the line priority. For example, the line priority of the communication line Li is set to be higher as the available communication speed Ri is higher. As another example, the line priority of the communication line Li may be set to be higher as a communication cost is lower. Then, the control device 150 allocates the multiple types of transmission target data D1 to Dm to the selected communication line Ls in the order of the data priority such that the selected communication line Ls is used up to the specified speed Ss equal to or lower than the available communication speed Rs of the selected communication line Ls.

5. Example of Remote Operator Terminal

Figure 11:
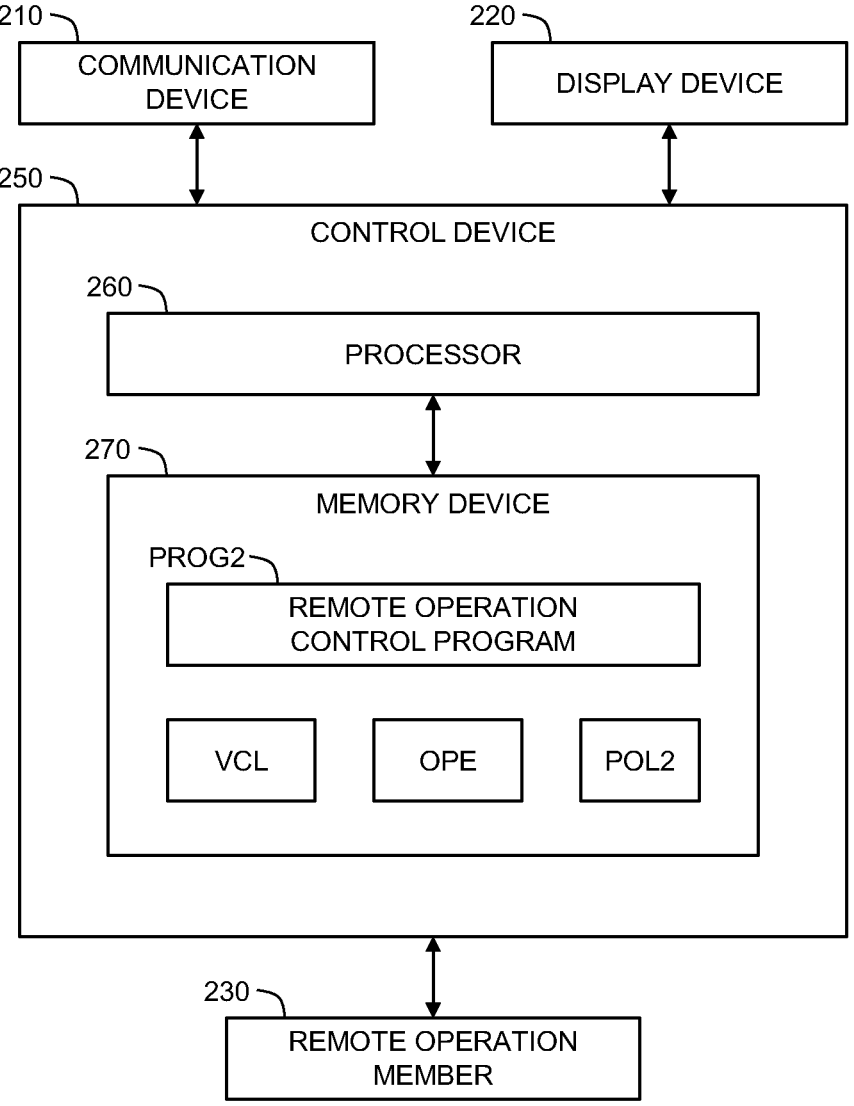
FIG. 11 is a block diagram showing a configuration example of a remote operator terminal according to an embodiment of the present disclosure.

FIG. 11 is a block diagram showing a configuration example of the remote operator terminal 200. The remote operator terminal 200 includes a communication device 210, a display device 220, a remote operation member 230, and a control device (controller) 250.

The communication device 210 communicates with the vehicle 100 and the management device 300. The communication device 210 includes the multiple communication interfaces 11-1 to 11-n shown in FIG. 1.

The display device 220 presents a variety of information to the remote operator O by displaying the variety of information.

The remote operation member 230 is a member operated by the remote operator O when remotely operating the vehicle 100. The remote operation member 230 includes a steering wheel, an accelerator pedal, a brake pedal, a direction indicator, and the like.

The control device 250 controls the remote operator terminal 200. The control device 250 includes one or more processors 260 (hereinafter simply referred to as a processor 260) and one or more memory devices 270 (hereinafter simply referred to as a memory device 270). The processor 260 executes a variety of processing. For example, the processor 260 includes a CPU. The memory device 270 stores a variety of information necessary for the processing by the processor 260. Examples of the memory device 270 include a volatile memory, a non-volatile memory, an HDD, an SSD, and the like.

A remote operation program PROG2 is a computer program executed by the processor 260. The functions of the control device 250 are implemented by the processor 260 executing the remote operation program PROG2. The remote operation program PROG2 is stored in the memory device 270. The remote operation program PROG2 may be recorded on a non-transitory computer-readable recording medium. The remote operation program PROG2 may be provided via a network.

The control device 250 communicates with the vehicle 100 via the communication device 210. The control device 250 receives the vehicle information VCL transmitted from the vehicle 100. The control device 250 presents the vehicle information VCL to the remote operator O by displaying the vehicle information VCL on the display device 220. The remote operator O is able to recognize the state of the vehicle 100 and the situation around the vehicle 100 based on the vehicle information VCL displayed on the display device 220.

The remote operator O operates the remote operation member 230. The amount of operation of the remote operation member 230 is detected by a sensor installed in the remote operation member 230. The control device 250 generates the remote operation information OPE reflecting the amount of operation of the remote operation member 230 performed by the remote operator O. Then, the control device 250 transmits the remote operation information OPE to the vehicle 100 via the communication device 210.

The control device 250 may execute the data transmission processing by using the multiple communication lines L1 to Ln (see Section 2 described above).

More specifically, the control device 250 acquires respective available communication speeds R1 to Rn of the multiple communication lines L1 to Ln. In addition, the control device 250 acquires the data priority of the multiple types of transmission target data D1 to Dm. For example, priority policy information POL2 indicating policy of setting of the data priority is stored in advance in the memory device 270 (see FIG. 9). In accordance with the priority policy information POL2, the control device 250 sets the data priority of the multiple types of transmission target data D1 to Dm.

The control device 250 selects the multiple communication lines L1 to Ln one by one in sequence. At this time, the control device 250 may acquire the line priority of the multiple communication lines L1 to Ln and select the multiple communication lines L1 to Ln one by one in the order of the line priority. For example, the line priority of the communication line Li is set to be higher as the available communication speed Ri is higher. As another example, the line priority of the communication line Li may be set to be higher as a communication cost is lower. Then, the control device 250 allocates the multiple types of transmission target data D1 to Dm to the selected communication line Ls in the order of the data priority such that the selected communication line Ls is used up to the specified speed Ss equal to or lower than the available communication speed Rs of the selected communication line Ls.

What is claimed is:

1. A communication control method for controlling a communication between a transmission-side device and a reception-side device, the communication control method comprising data transmission processing that transmits multiple types of transmission target data in parallel from the transmission-side device to the reception-side device by using multiple communication lines, wherein the data transmission processing includes:

acquiring an available communication speed of each of the multiple communication lines;

acquiring data priority of the multiple types of transmission target data;

selecting the multiple communication lines one by one in sequence; and allocating the multiple types of transmission target data to the selected communication line in an order of the data priority such that the selected communication line is used up to a specified speed equal to or lower than the available communication speed of the selected communication line, the multiple types of transmission target data include a first transmission target data and a second transmission target data whose data priority is lower than that of the first transmission target data, the multiple communication lines include a first communication line and a second communication line selected next to the first communication line, in a case where the specified speed of the first communication line is not used up after all of the first transmission target data is allocated to the first communication line, at least a part of the second transmission target data is allocated to the first communication line, and in a case where the specified speed of the first communication line is used up when a part of the first transmission target data is allocated to the first communication line, a remainder of the first transmission target data is allocated to the second communication line.

2. The communication control method according to claim 1, wherein an unallocated data is a transmission target data that is not allocated to any of the multiple communication lines after all specified speeds of the multiple communication lines are used up, and the data transmission processing further includes discarding the unallocated data without allocating the unallocated data to any communication line.

3. The communication control method according to claim 1, wherein the selecting the multiple communication lines one by one in sequence includes:

acquiring line priority of the multiple communication lines; and selecting the multiple communication lines one by one in an order of the line priority.

4. A communication control method for controlling a communication between a transmission-side device and a reception-side device, the communication control method comprising data transmission processing that transmits multiple types of transmission target data in parallel from the transmission-side device to the reception-side device by using multiple communication lines, wherein the data transmission processing includes:

acquiring an available communication speed of each of the multiple communication lines;

acquiring data priority of the multiple types of transmission target data;

selecting the multiple communication lines one by one in sequence; and allocating the multiple types of transmission target data to the selected communication line in an order of the data priority such that the selected communication line is used up to a specified speed equal to or lower than the available communication speed of the selected communication line, wherein the selecting the multiple communication lines one by one in sequence includes:

acquiring line priority of the multiple communication lines; and selecting the multiple communication lines one by one in an order of the line priority, an unallocated data is a transmission target data that is not allocated to any of the multiple communication lines after all specified speeds of the multiple communication lines are used up, a lowest priority communication line is a communication line having a lowest line priority among the multiple communication lines, and the data transmission processing further includes allocating the unallocated data to the lowest priority communication line beyond the specified speed of the lowest priority communication line.

5. The communication control method according to claim 1, wherein the specified speed is equal to the available communication speed.

6. The communication control method according to claim 1, wherein the transmission-side device is one of a moving body being a target of a remote operation performed by a remote operator and a remote operator terminal on a side of the remote operator, the reception-side device is another of the moving body and the remote operator terminal, and the multiple types of transmission target data are data necessary for the remote operation performed by the remote operator.

7. The communication control method according to claim 6, wherein the transmission-side device is the moving body, the reception-side device is the remote operator terminal, and the multiple types of transmission target data include multiple types of images respectively captured by multiple cameras mounted on the moving body.

8. The communication control method according to claim 7, wherein the acquiring the data priority of the multiple types of transmission target data includes:

acquiring information reflecting a scheduled moving direction of the moving body; and setting the data priority of an image closer to the scheduled moving direction to be higher than the data priority of another image farther from the scheduled moving direction.

9. A transmission-side device that transmits data to a reception-side device, the transmission-side device comprising a control device configured to execute data transmission processing that transmits multiple types of transmission target data in parallel to the reception-side device by using multiple communication lines, wherein the data transmission processing includes:

acquiring an available communication speed of each of the multiple communication lines;

acquiring data priority of the multiple types of transmission target data;

selecting the multiple communication lines one by one in sequence; and allocating the multiple types of transmission target data to the selected communication line in an order of the data priority such that the selected communication line is used up to a specified speed equal to or lower than the available communication speed of the selected communication line, the multiple types of transmission target data include a first transmission target data and a second transmission target data whose data priority is lower than that of the first transmission target data, the multiple communication lines include a first communication line and a second communication line selected next to the first communication line, in a case where the specified speed of the first communication line is not used up after all of the first transmission target data is allocated to the first communication line, at least a part of the second transmission target data is allocated to the first communication line, and in a case where the specified speed of the first communication line is used up when a part of the first transmission target data is allocated to the first communication line, a remaining of the first transmission target data is allocated to the second communication line.

* * * * *